United States Patent [19]
Rudell et al.

[11] Patent Number: 6,054,156
[45] Date of Patent: *Apr. 25, 2000

[54] CONTACT ACTIVATED SOUND AND LIGHT GENERATING NOVELTY FOOD CONTAINERS

[75] Inventors: Elliot A. Rudell, 1619 Gramercy Ave., Torrance, Calif. 90501; Raymond Earl Fisher, Torrance; George Foster, Long Beach, both of Calif.

[73] Assignee: Elliot A. Rudell, Torrance, Calif.

[*] Notice: This patent is subject to a terminal disclaimer.

[21] Appl. No.: 09/172,516

[22] Filed: Oct. 14, 1998

Related U.S. Application Data

[62] Division of application No. 08/866,561, May 30, 1997.

[51] Int. Cl.[7] .................................................. A21D 10/02
[52] U.S. Cl. ........................ 426/104; 426/87; 426/134; 446/386; 446/397; 446/404; 340/540
[58] Field of Search .................................. 446/397, 404, 446/386; 426/134, 91, 104, 87, 112, 110; 340/540

[56] References Cited

U.S. PATENT DOCUMENTS

| | | |
|---|---|---|
| D. 260,655 | 9/1981 | Guay . |
| 2,126,858 | 8/1938 | Zadek . |
| 2,663,866 | 12/1953 | Simpson . |
| 2,722,153 | 11/1955 | Greco . |
| 2,787,055 | 4/1957 | Wertz . |
| 2,800,825 | 7/1957 | Toussaint . |
| 2,980,039 | 4/1961 | Jolly . |
| 3,510,643 | 5/1970 | File . |
| 3,592,195 | 7/1971 | Van Wagenen . |
| 3,627,161 | 12/1971 | Wergeland . |
| 3,655,325 | 4/1972 | Toppel . |
| 3,839,793 | 10/1974 | Crapio . |
| 4,072,314 | 2/1978 | Rosen et al. . |
| 4,121,835 | 10/1978 | Garabedian . |
| 4,207,673 | 6/1980 | DiGirolamo et al. . |
| 4,252,273 | 2/1981 | Karterman . |

(List continued on next page.)

FOREIGN PATENT DOCUMENTS

WO 94/17691   8/1994   WIPO .

*Primary Examiner*—Milton Cano
*Assistant Examiner*—Hao Mai
*Attorney, Agent, or Firm*—Blakely Sokoloff Taylor & Zafman

[57] ABSTRACT

A toy that emits a sound and/or emits light when an end user drinks a liquid through a straw. The toy includes a first electrode and a second electrode in fluid communication with an inner channel of the straw. The electrodes are connected to an indicator such as a light source or a sound generating device. When the end user drinks a liquid through the straw the liquid provides an electrical path between the electrodes. The liquid closes a circuit between the electrodes and activates the indicator. The present invention also includes a sound/light emitting toy which supports a piece of candy. The toy includes a first electrode that can be grasped by the end user and a second electrode that is in contact with the candy. The electrodes are connected to an indicator. By licking the candy the end user provides an electrical path between the electrodes which closes a circuit and activates the indicator.

3 Claims, 6 Drawing Sheets

U.S. PATENT DOCUMENTS

| | | |
|---|---|---|
| 4,282,681 | 8/1981 | McCaslin . |
| 4,341,230 | 7/1982 | Siahou ................................... 132/84 |
| 4,347,683 | 9/1982 | Maxim . |
| 4,383,386 | 5/1983 | Giordano et al. . |
| 4,531,310 | 7/1985 | Acson et al. . |
| 4,631,715 | 12/1986 | Hoover . |
| 4,646,350 | 2/1987 | Batra . |
| 4,765,623 | 8/1988 | Cardillo et al. . |
| 4,779,344 | 10/1988 | Panisch . |
| 4,809,335 | 2/1989 | Rumsey . |
| 4,828,527 | 5/1989 | Spector . |
| 4,840,371 | 6/1989 | Harris . |
| 4,914,748 | 4/1990 | Schlotter, IV et al. ................. 362/109 |
| 4,936,780 | 6/1990 | Cogliano . |
| 4,941,857 | 7/1990 | Fujimaki . |
| 5,043,704 | 8/1991 | Blakeney . |
| 5,073,140 | 12/1991 | Lebensfeld et al. . |
| 5,075,970 | 12/1991 | Albert . |
| 5,094,644 | 3/1992 | Kelley . |
| 5,203,530 | 4/1993 | Liw ......................................... 248/309 |
| 5,209,692 | 5/1993 | Coleman et al. . |
| 5,228,879 | 7/1993 | Fromm . |
| 5,233,662 | 8/1993 | Christensen . |
| 5,391,107 | 2/1995 | Coleman ................................. 446/484 |
| 5,536,196 | 7/1996 | Sternberg . |
| 5,722,590 | 3/1998 | Miller . |
| 5,785,406 | 7/1998 | Lee . |
| 5,939,983 | 8/1999 | Rudell et al. ........................... 340/540 |

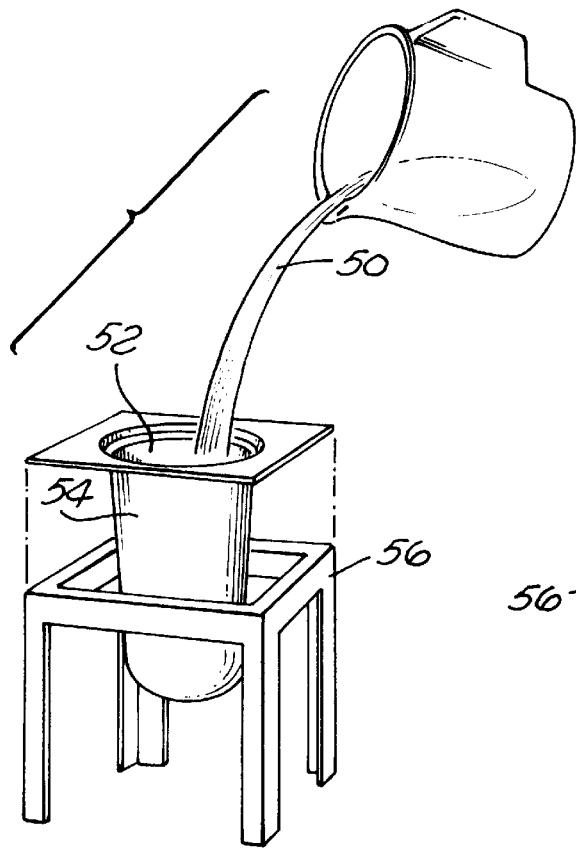
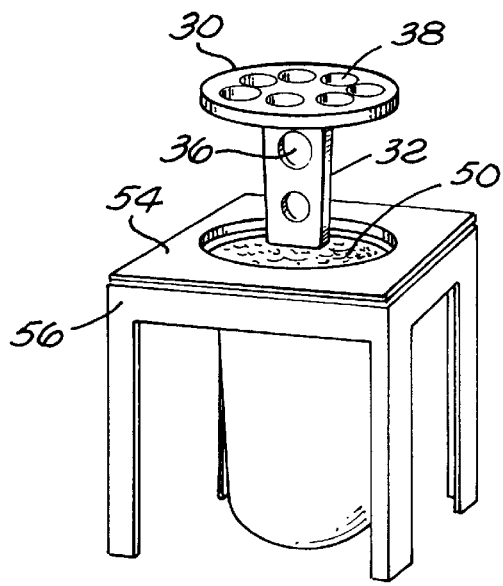
FIG. 4      FIG. 5
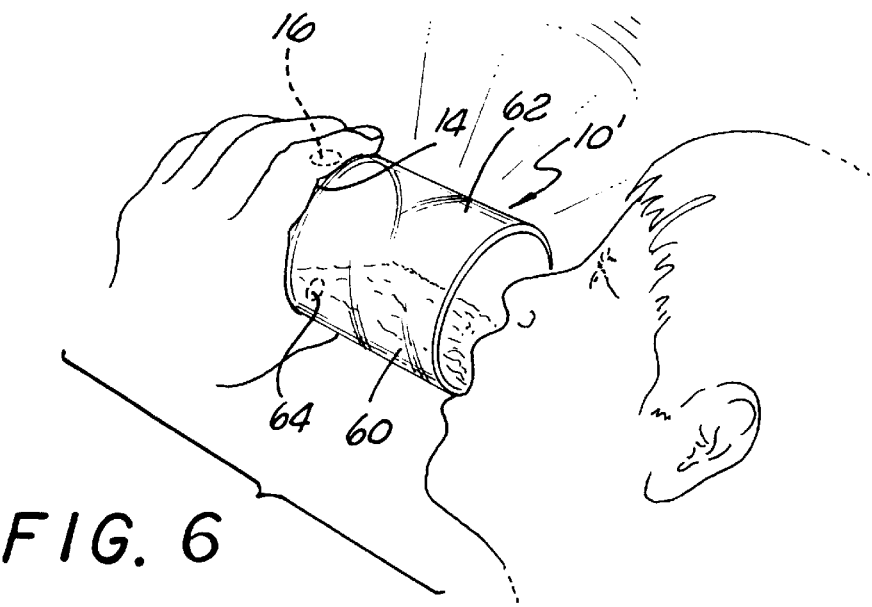
FIG. 6

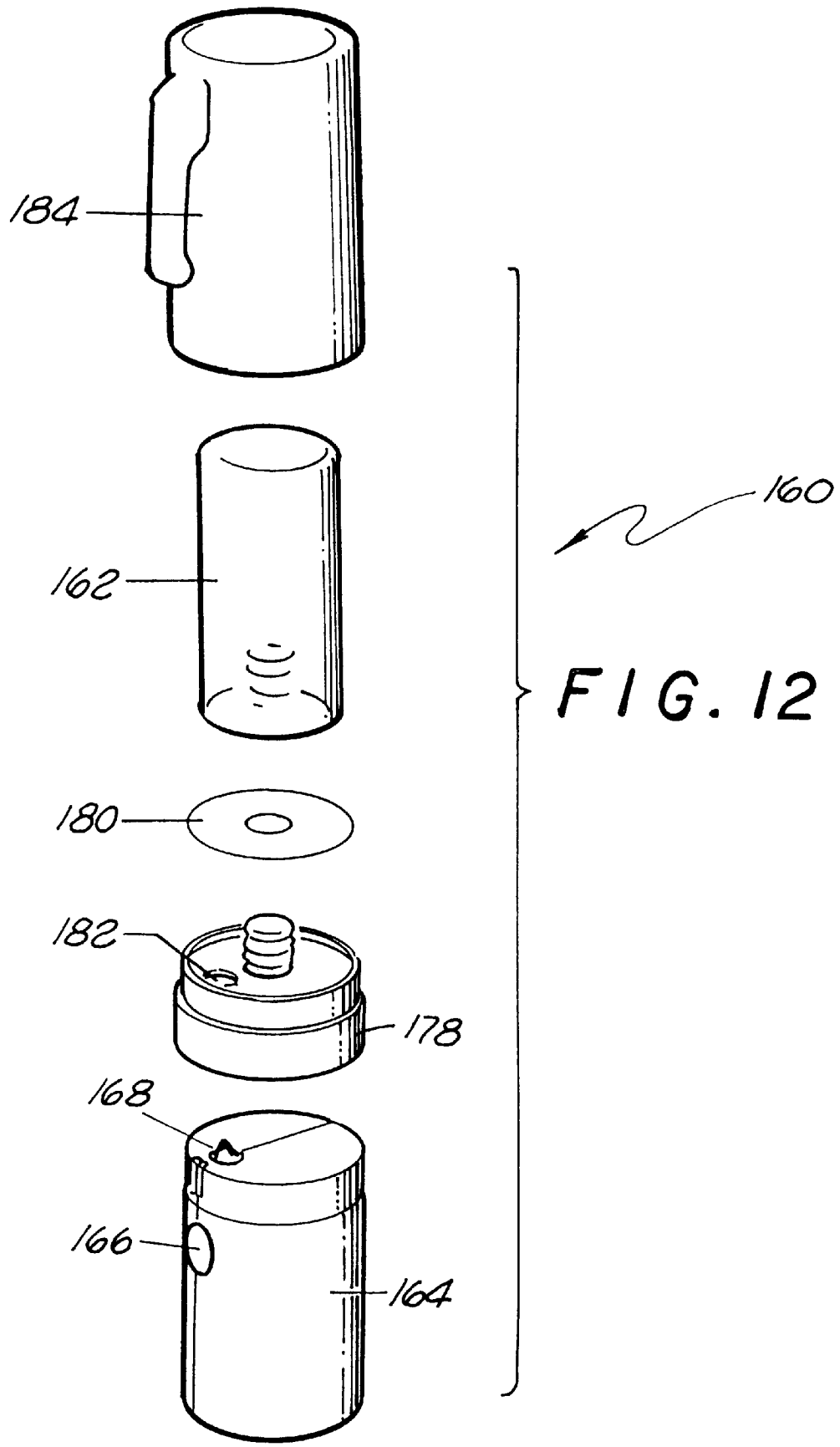

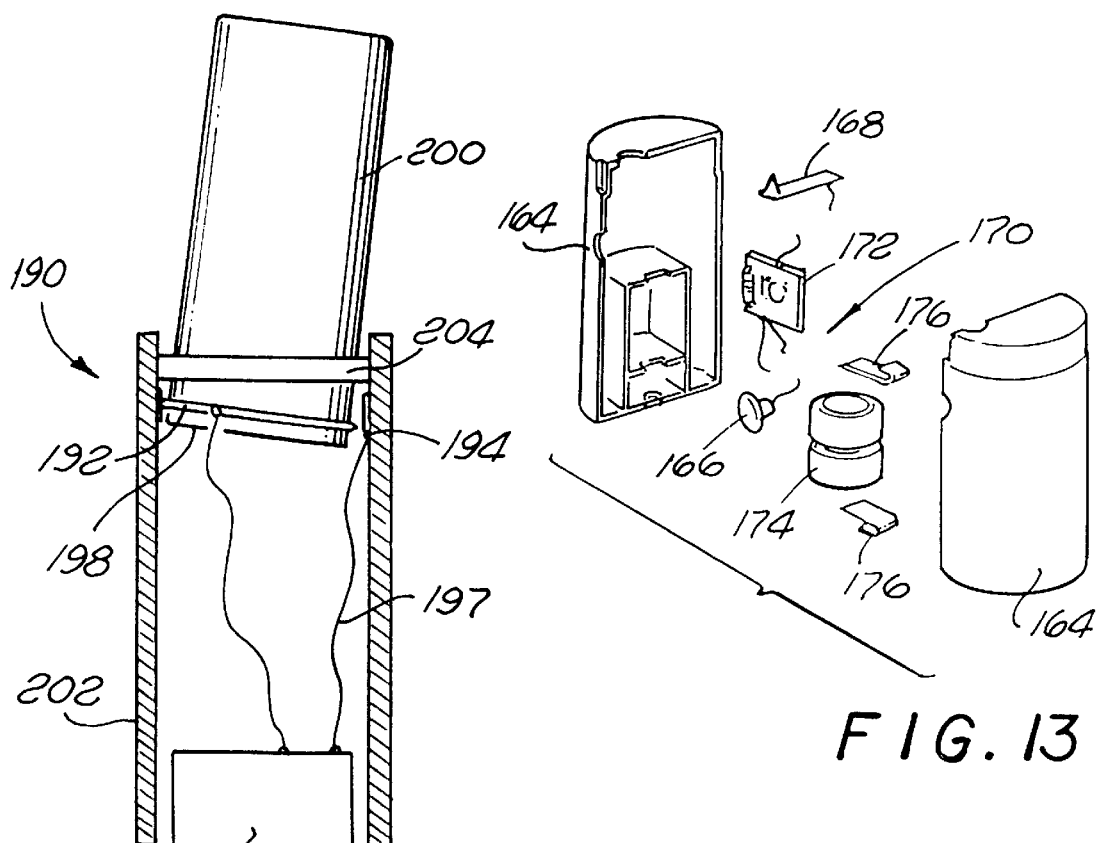
FIG. 14
FIG. 13
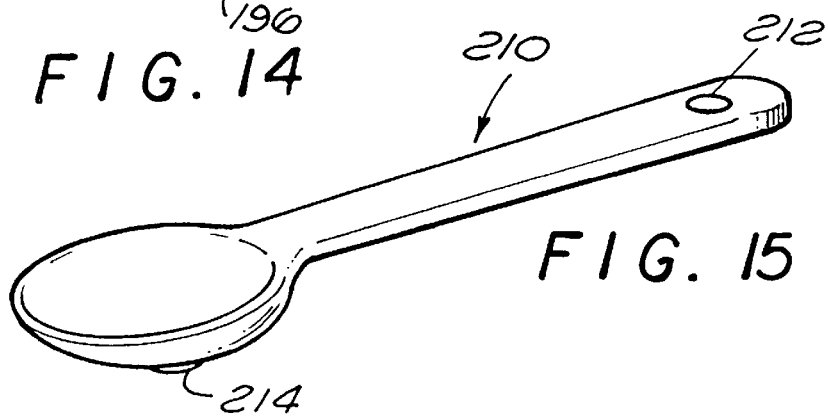
FIG. 15
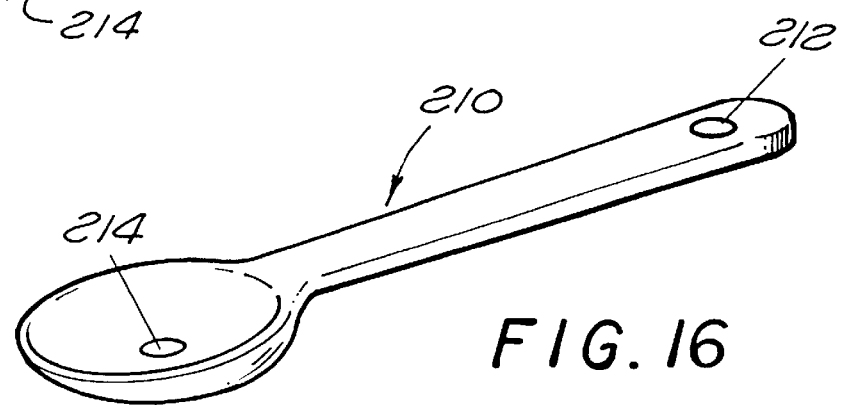
FIG. 16

CONTACT ACTIVATED SOUND AND LIGHT GENERATING NOVELTY FOOD CONTAINERS

This application is a divisional of application Ser. No. 08/866,561, filed on May 30, 1997.

BACKGROUND OF THE INVENTION

1. Field of the Invention

The present invention relates to a sound emitting and/or illuminated toy "ice pop".

2. Description of Related Art

Toys which provide an element of mystery to a child have been commercially successful. One such type of toy was a doll marketed by DSI, Inc. under the trademark ROSIE. ROSIE would speak when an end user(s) held both of the doll's hands. The hands each had an electrode that were coupled to a sound generating device within the doll. By grasping the doll's hands the end user provided a switch that electrically coupled the electrodes. The coupled electrodes closed a circuit within the doll so that the sound generating device produced a sound.

Tiger Electronics and Captoys, Inc. have both marketed sound producing wands under the trademarks BUBBLE BOPPER and MUSICAL BUBBLE TUNES, respectively. The wands each had electrodes that were coupled to a sound generating device. The end user would create a liquid bubble and then try to place the electrodes in contact with the bubble. When in contact with the wand, the liquid bubble would provide a medium that electrically coupled the electrodes so that the sound device generated a sound.

U.S. Pat. No. 4,914,748 issued to Schlotter, IV et al. discloses a novelty flashlight which illuminates a piece of candy when the end user depresses a button on a handle of the device.

SUMMARY OF THE INVENTION

The present invention is a toy that emits a sound and/or emits light when an end user drinks a liquid through a straw. The toy includes a first electrode and a second electrode in fluid communication with an inner channel of the straw. The electrodes are connected to an indicator such as a light source or a sound generating device. When the end user drinks a liquid through the straw the liquid provides an electrical path between the electrodes. The liquid closes a circuit between the electrodes and activates the indicator. The present invention also includes a sound/light emitting toy which supports a piece of candy. The toy includes a first electrode that can be grasped by the end user and a second electrode that is in contact with the candy. The electrodes are connected to an indicator. By licking the candy the end user provides an electrical path between the electrodes which closes a circuit and activates the indicator.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 4 is a perspective view showing a liquid being poured into a mold;

FIG. 5 is a perspective view showing a substrate being inserted into the mold;

FIG. 6 is a perspective view showing an alternate embodiment of the toy device;

FIG. 12 is an exploded view of a toy that supports a piece of candy;

FIG. 13 is an exploded view of a handle of the toy shown in FIG. 12;

FIG. 14 is a cross-sectional view of an alternate embodiment of the toy shown in FIG. 12;

FIG. 15 is a perspective view of a utensil which has a pair of electrodes;

FIG. 16 is an alternate embodiment of the utensil shown in FIG. 15.

DETAILED DESCRIPTION OF THE INVENTION

Figure 1:
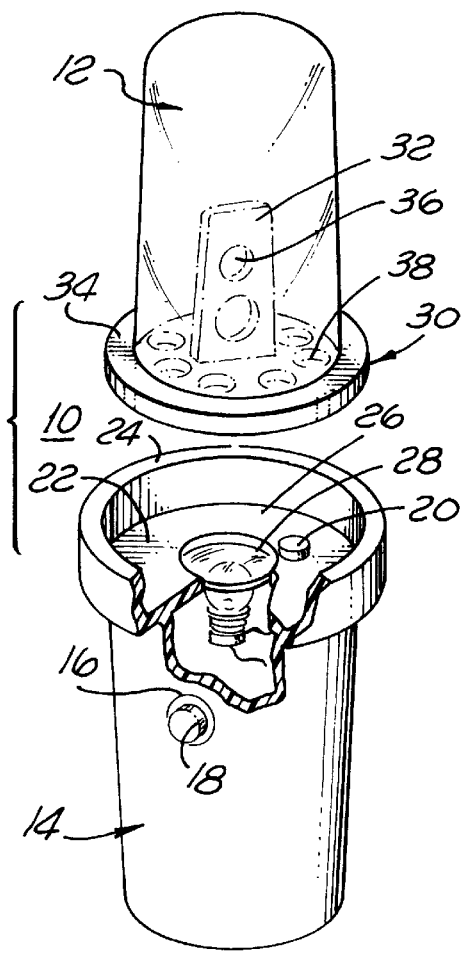
FIG. 1 is a perspective view of a toy device of the present invention.

Referring to the drawings more particularly by reference numbers, FIG. 1 shows a toy device 10 of the present invention. The toy device 10 includes a frozen liquid 12 that is coupled to a handle 14. The device 12 has a first electrode 16 located on an outer surface of the handle 14. The first electrode 16 is preferably concentric with a button 18 that can be depressed by the end user. The device 12 also contains a second electrode 20 that is located within a cavity 22 that is defined by an annular lip 24 of the handle 14. Mounted to a base 26 of the cavity 22 is a light bulb 28. The handle 14 is typically constructed from a low cost molded plastic material. The electrodes 16 and 20 are typically constructed from an electrically conductive material such as copper.

The frozen liquid 12 is preferably a flavored water based substance typically used to form "popcycles" that can be licked and consumed by an end user. The frozen liquid 12 is supported by a substrate 30. The substrate 30 includes a tab 32 that extends from a base plate 34. The tab 32 preferably contains holes 36 that increase the adhesion of the frozen liquid 12 to the substrate during the formation of the frozen element 12. The base plate 34 has a plurality of holes 38 that allow the second electrode 20 to come into contact with the frozen liquid 12 when the substrate 30 is inserted into the cavity 22.

Figure 2:
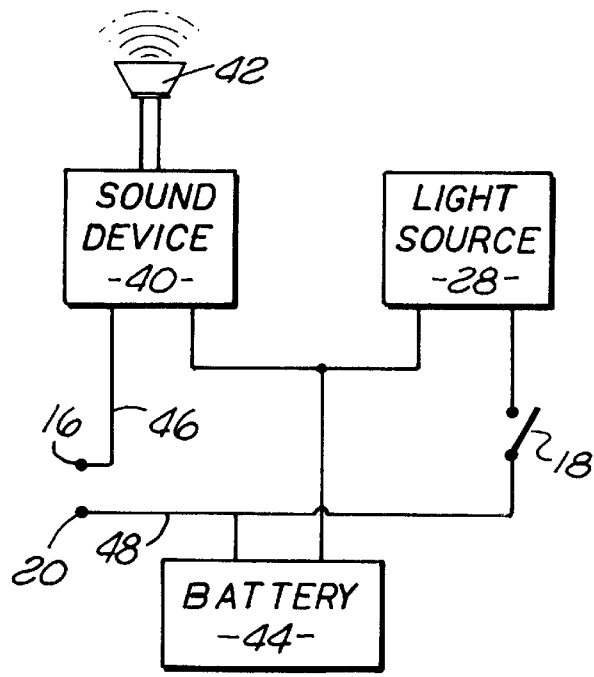
FIG. 2 is a schematic of a circuit of the toy device.

FIG. 2 shows a schematic of the electrical system of the toy device 10. The handle 14 contains a sound generating device 40 and a speaker 42 that can generate and emit sounds from the device 10. The sound generating device 40 can be a sound generating integrated circuit(s) mounted to a printed circuit board as is known in the art. The device 40 can generate a series of different sounds to increase the complexity of the toy 10. For example, the device 40 may generate a "whoop" sound, followed by a "quack" sound.

The device 10 also contains a battery 44 that powers the sound generating device 40 and the speaker 42. The battery 44 is typically a 1.5 or 3 volt device that can be installed by removing a cover (not shown) located at the bottom of the handle 14.

The first electrode 16 is connected to the sound device 40 by line 46. The battery 44 is connected to the second electrode 20 by line 48. The sound generating device 40 receives power and generates sound when the first electrode 16 is electrically coupled to the second electrode 20. The light bulb 28 is coupled to the battery 44 by the button 18. The light bulb 28 emits a beam of light into the frozen liquid 12 when the button 18 is depressed and the circuit is closed to connect the battery 44 to the bulb 28.

Figure 3:
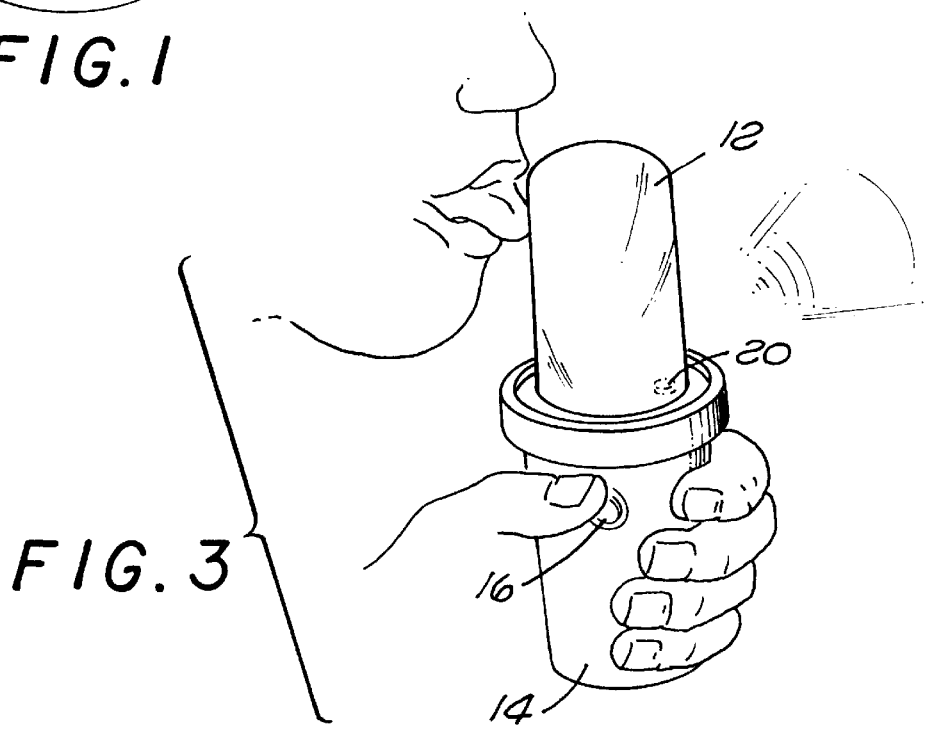
FIG. 3 is a perspective view showing an end user operating the toy device.

As shown in FIG. 3, the toy device 10 is operated by an end user who grabs the handle 14 and licks the frozen liquid 12. The hand of the end user is in contact with the first electrode 16. The tongue of the end user is electrically coupled to the second electrode 20 by the frozen liquid 12. The end user and frozen liquid 12 electrically couple the first electrode 16 to the second electrode 20 so that the sound generating device 40 and speaker 42 emit a sound(s). The toy device 10 will emit a sound each time the end user licks the frozen liquid 12, thereby providing an element of surprise and mystery in using the toy. The end user can also depress the button 18 to illuminate the frozen liquid while licking the device 10.

FIGS. 4 and 5 show a preferred method of forming the frozen liquid 12. The liquid substance 50 is poured into an inner cavity 52 of a mold 54. The mold 54 is supported by a stand 56. The mold 54 is preferably constructed from a flexible resilient material which can be readily detached from the frozen liquid after formation, and used for the creation of another frozen element. The substrate 30 is inserted into the inner cavity 52 while the substance 50 is in the liquid state. The mold 54, liquid 50 and substrate 30 are then placed in a refrigeration unit to change the phase of the substance to a solid state. The mold 54 and frozen liquid 12 are lifted from the stand 56 and the mold 54 is then peeled away from the frozen item 12. The substrate 30 can then be snapped into the handle 14 to assembly the toy device 10.

FIG. 6 shows an alternate embodiment of the toy device 10' which utilizes a liquid 60 and the end user to couple the first 16 and second 20 electrodes of the handle 14. The liquid 60 is located within a cup 62 which has a contact 64 that is in contact with the second electrode 20. The cup 62 is preferably constructed from a transparent material so that the liquid can be illuminated by the light bulb 28. When the end user drinks the liquid, the user and liquid create an electrical path between the electrodes 16 and 20, so that the sound generating device 40 and speaker 42 emit a sound.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. By way of example, the circuit can be varied so that the toy illuminates the frozen liquid when the end user licks the frozen item. As a further alternate embodiment, the toy can both illuminate the frozen liquid and emit a sound when the end user licks the frozen item. Additionally the toy device may be constructed without the electrodes, wherein the device illuminates the frozen item by depressing the button 18, and/or emits a sound when the button 18 is depressed.

Figure 7:
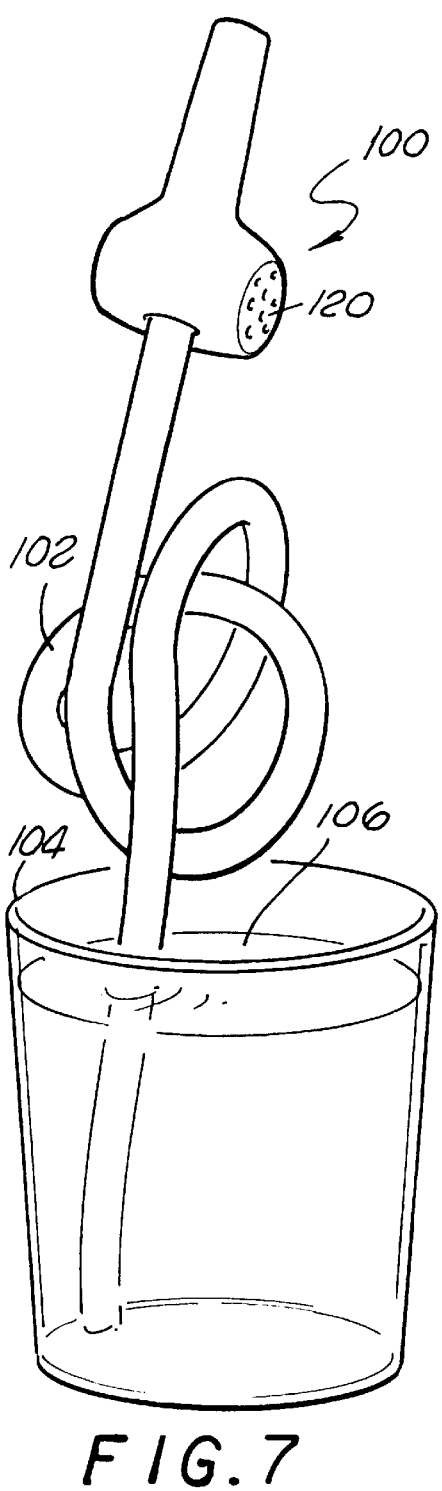
FIG. 7 is a perspective view showing a toy of the present invention.
Figure 7A:
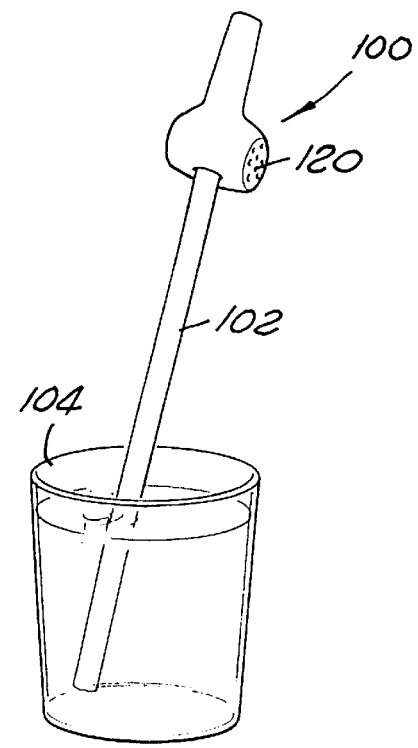
FIG. 7a is a perspective view showing the toy attached to a straight straw.
Figure 8:
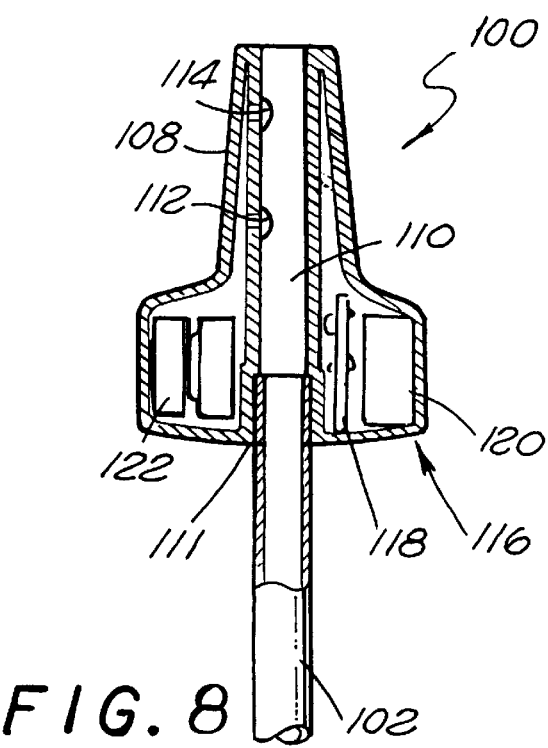
FIG. 8 is a cross-sectional view showing the toy of FIG. 7.

FIGS. 7, 7a and 8 show a toy 100 of the present invention. The toy 100 may be attached to a conventional or twisted straw 102 that is placed into a container 104 which has a liquid 106. The toy straw 100 includes a housing 108 which has an inner channel 110 that is in fluid communication with the liquid 106 within the container 104. The housing 108 may have a port 111 that receives the end of the conventional straw 102.

Located within the inner channel 110 is a first electrode 112 and a second electrode 114. One of the electrodes 112 or 114 is connected to an indicator 116. The indicator 116 may be a sound generating device such as a "sound chip" 118 that is coupled to a speaker 120. The speaker 120 and chip 118 generate a sound when the indicator 116 is activated. Alternatively, the indicator 116 may be a light source that emits a beam of light when activated. As yet another alternative, the indicator 116 may include both a light source and a sound generating device.

The housing 108 may include batteries 122 that are electrically connected to the indicator 116 and one of the electrodes 112 or 114. The housing 108 can be constructed from a plastic material such as high impact styrene or polypropylene that is molded about both the indicator 116 and the batteries 122.

In operation, the end user draws the liquid 106 through the inner channel 110 of the toy 100 and past the electrodes 112 and 114. The liquid within the inner channel 110 creates an electrical path between the electrodes 112 and 114. The electrical path closes the circuit and activates the indicator 116.

Figure 9:
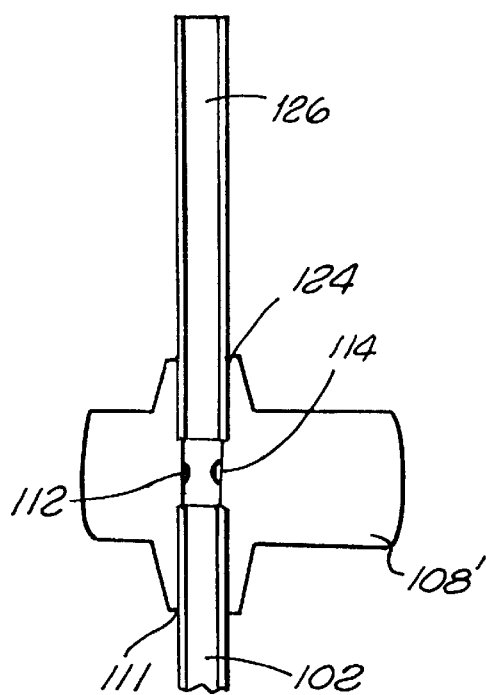
FIG. 9 is a cross-sectional view showing an alternate embodiment of the toy.

FIG. 9 shows an alternate embodiment wherein the housing 108' has a second port 124 that can receive another conventional straw 126. The straw 126 can be pulled out of the housing 108' and replaced with another straw. The housing 108' can therefore be reused without requiring that the end user come into contact with the housing 108'. The housing 108' includes the first 112 and second 114 electrodes and an indicator (not shown).

Figure 10:
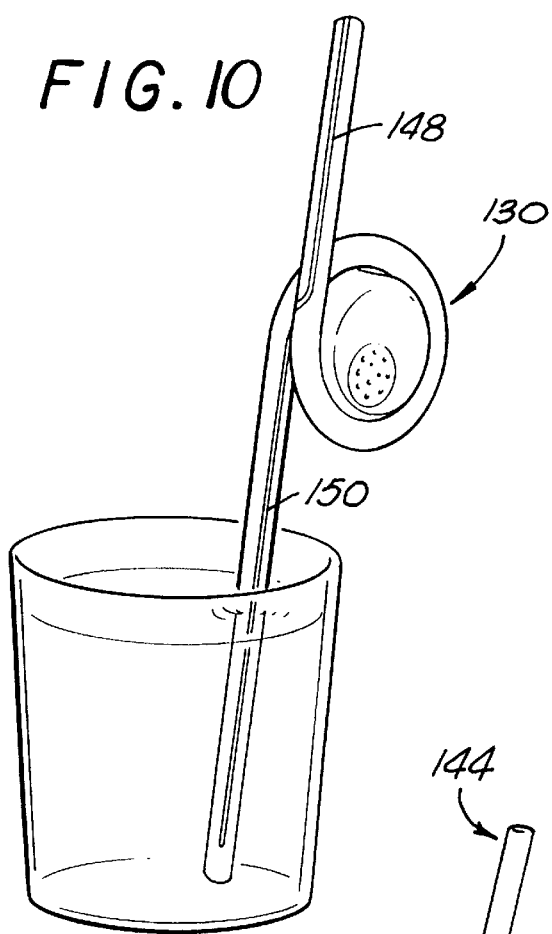
FIG. 10 is a perspective view of an alternate embodient of the toy.
Figure 11:
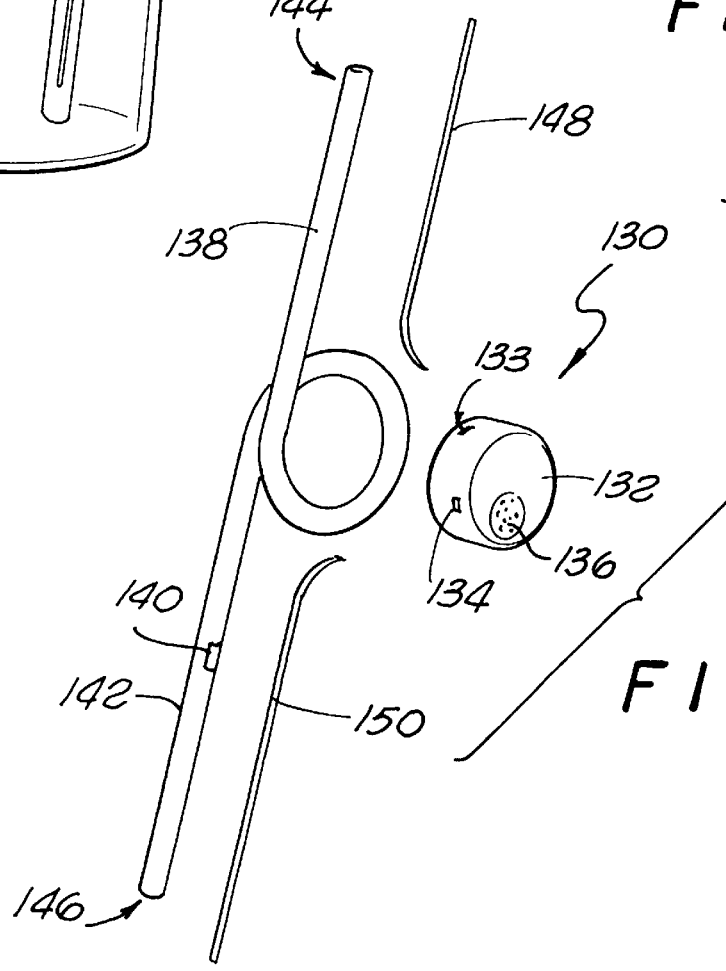
FIG. 11 is an exploded view of the toy of FIG. 10.

FIGS. 10 and 11 show another embodiment of a toy 130. The toy 130 includes a housing 132 which has a first electrode 133 and a second electrode 134. The electrodes 132 and 134 are coupled to an indicator 136 which may be a light source or a sound generating device. The housing 132 is attached to a conventional straw 138 which has an inner channel 140 and an outer surface 142. The channel 140 and outer surface 142 extend from a proximal end 144 to a distal end 146 of the straw 138. The first electrode 132 includes a conductive strip 148 that extends along the outer surface to the proximal end 144 of the straw 130. The second electrode 134 includes a conductive strip 150 that extends to the distal end 146.

The indicator 136 is activated when the end user makes contact with the conductive strip 148 and draws liquid through the inner channel of the straw 138 to create an electrical path between the first 132 and second 134 electrodes. The strips 148 and 150, liquid, and end user create an electrical path between the electrodes 132 and 134.

FIGS. 12 and 13 show a toy 160 which supports an edible substance such as a piece of hard candy 162. The toy 160 includes a handle 164 which has a first electrode 166 and a second electrode 168. The electrodes 166 and 168 are coupled to an indicator 170. The indicator 170 may include a sound generating device 172, batteries 174 and battery contacts 176. Alternatively, the indicator 170 may be a light source (noth shown), or a light source and the sound generating device 172.

The candy 162 is attached to an anchor 178 that is mounted to the handle 164. A metal foil 180 can be placed between the candy 162 and the base of the anchor 178. The anchor 178 has an aperture 182 that allows contact between the second electrode 168 and the foil 180 to create an electrical path between the candy 162 and the electrode 168. The toy 160 may include a removable cap 184 that protects the candy 162.

In operation, the end user grabs the first contact 166 and licks the candy 162. Although the present invention is not limited to such a theory of operation, it is believed that saliva deposited onto the candy by the end user creates an electrical path between the foil 180 and the user. When the end user makes contact with the candy, the user, saliva and foil 180 create an electrical path between the electrodes 166 and 168 and activate the indicator 170.

FIG. 14 shows an alternate embodiment of a toy 190. The toy 190 includes a first electrode 192 and a second electrode 194 that are connected to an indicator 196 by wires 197. The indicator 196 may be a sound generating device and/or a light source. The first electrode 192 is connected to an anchor 198 that supports an edible substance such as a piece of candy 200. The second electrode 194 is attached to a handle 202.

The anchor 198 and toy handle 202 are constructed so that the candy 200 can pivot within the handle 202. Movement of the candy 200 creates an electrical contact between the electrodes 192 and 194, and activates the indicator 196. By way of example, the candy 200 may pivot about a gimbal 204 incorporated into the handle 202. When the end user licks the candy, the force of the tongue creates a moment that pivots the anchor 198 to create an electrical contact between the electrodes and activates the indicator 196.

FIGS. 15 and 16 show a toy utensil 210 which has a pair of electrodes 212 and 214 that are connected to an indicator (not shown). The indicator is activated when the end user grabs the electrode 212 and places the electrode 214 within their mouth. The embodiment shown in FIG. 15 allows contiguous contact between the user and the electrode 214. In the embodiment shown in FIG. 16 food placed within the spoon is also part of the electrical path so that when the end user consumes the food the indicator is activated.

What is claimed is:

1. A combine of a toy and an edible substance, comprising:

a handle supporting the edible substance so that the edible substance can move within said handle;

a first electrode that is attached to the edible substance;

a second electrode that is attached to said handle; and an indicator that is coupled to said first and second electrodes, said indicator is activated when an end user consumes and moves the edible substance and said first electrode makes an electrical connection with said second electrode.

2. The toy as recited in claim 1, wherein said indicator includes a sound generating device.

3. The toy as recited in claim 1, wherein said indicator includes a light source.

* * * * *

UNITED STATES PATENT AND TRADEMARK OFFICE
CERTIFICATE OF CORRECTION

PATENT NO. : 6,054,156
DATED : April 25, 2000
INVENTOR(S) : Elliot Rudell et al.

It is certified that error appears in the above-identified patent and that said Letters Patent is hereby corrected as shown below:

Column 6,
Line 14, please replace "combine" with -- combination --.
Line 18, please replace "attached" with -- coupled --.

Signed and Sealed this

Sixteenth Day of April, 2002

Attest:

Attesting Officer

JAMES E. ROGAN
Director of the United States Patent and Trademark Office